US006830835B2

(12) United States Patent
Saito et al.

(10) Patent No.: US 6,830,835 B2
(45) Date of Patent: Dec. 14, 2004

(54) DISPLAY FILM

(75) Inventors: Masafumi Saito, Ikeda (JP); Hideki Yaguchi, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/666,627

(22) Filed: Sep. 18, 2003

(65) Prior Publication Data

US 2004/0126618 A1 Jul. 1, 2004

(30) Foreign Application Priority Data

Nov. 12, 2002 (JP) ....................................... 2002-327793

(51) Int. Cl.[7] ............................ B32B 19/00; B32B 9/00

(52) U.S. Cl. ....................... 428/690; 428/203; 428/913; 428/913.3

(58) Field of Search ................................ 428/203, 690, 428/913, 913.3

(56) References Cited

U.S. PATENT DOCUMENTS

2004/0043248 A1 * 3/2004 Bharti ........................ 428/690
2004/0126618 A1 * 7/2004 Saito et al. ................. 428/690

FOREIGN PATENT DOCUMENTS

| | | |
|---|---|---|
| GB | 2 147 542 | 5/1985 |
| JP | 2000-204320 | 7/2000 |
| JP | 2002-518208 | 6/2002 |
| WO | WO 98/30998 | 7/1998 |

* cited by examiner

*Primary Examiner*—B. Shewareged
(74) *Attorney, Agent, or Firm*—James D. Christoff

(57) ABSTRACT

A display film is capable of displaying different images between under a condition with luminous source and under a condition with a luminous source in a small space and capable of clear display by emission under a condition without a luminous source. The display film comprises: a first display layer which has a phosphorescent agent 5 or a shade agent 6 on at least a part of a surface of an opaque and nonporous substrate sheet 4 composed of a phosphorescent material as necessary and on which a first image 10 visible under a condition without a luminous source, a second display layer including a porous sheet 7 having a plurality of pores, which is disposed on the first display layer 1 in a condition such that the second display layer 2 partially conceals the first image 10 and on which a second image 11 visible under a luminous source is formed on the other hand, and a transparent protective layer disposed on the second display layer 2.

9 Claims, 1 Drawing Sheet

DISPLAY FILM

RELATED APPLICATION DATA

This application claims priority to JP 2002-327793 filed on Nov. 12, 2002.

BACKGROUND OF THE INVENTION

1. Field of the Invention

The present invention relates to a display film. More particularly, the present invention relates to a display film that can display an image under a luminous source such as sunlight or fluorescent light different from an image under the conditions without a luminous source.

2. Description of the Related Art

Conventionally, signs, signboards, and the like that can display an image under a luminous source such as sunlight or fluorescent light different from an image under the conditions without a luminous source have been developed. For example, Japanese Patent Application Laid-open No. 2000-204320 describes a pigment or coating material prepared by mixing a phosphorescent agent, a fluorescent/phosphorescent body, and an organic pigment and a picture drawn using the pigment or coating material. Lights emitted or reflected by these components interfere with each other to emit colors different from the light when these components are individually used.

However, to display a different image on this picture drawn using the pigment or coating material by causing the phosphorescent agent and fluorescent/phosphorescent body to emit light, an excitation luminous source other than visible rays such as black light has to be employed instead of a common luminous source such as sunlight or fluorescent light.

In addition, since this picture displays a desired image by the interference effect of light, the types and mixing ratio of the phosphorescent agent, fluorescent/phosphorescent body, and organic pigment have to be exactly selected. Therefore, this picture has problems with production efficiency and cost.

Further, since this picture comprises a color-emitting layer provided by entirely covering the surface of a phosphorescent layer, energy of the excitation light is lost in the color-emitting layer. Therefore, it is difficult to intensify the luminescence of the phosphorescent layer.

Published Japanese Translation of PCT Publication for Patent Application No. 2001-507821 and the corresponding WO 98/30998 propose a signage article comprising a translucent film having a first image and a light-filtering film having a second image and disposed on the translucent film, wherein a displayed image varies according to the correlation between the luminescence of the surface of the light-filtering film and that of the back surface of the translucent film.

However, since this signage article requires a backlighting device and external power supply for changing an image from the second image to the first image, it is difficult to make a small and thin signage article. Therefore, the desire for saving installation space cannot sufficiently be satisfied.

Published Japanese Translation of PCT Publication for Patent Application No. 2002-518208 describes a film comprising a porous film having an electroluminescent or photoluminescent surface, wherein the film allows a desired image to be seen when viewed from one side and a view through the window from the other side.

However, this film does not aim to display an image under a luminous source different from that under the conditions without a luminous source. In addition, an external power supply is required to cause the electroluminescent surface to emit light. Therefore, it is difficult to make a small image display.

SUMMARY OF THE INVENTION

The present invention provides a display film that can display an image under a luminous source such as sunlight or fluorescent light different from an image under the conditions without a luminous source, for example, at night and can provide a clear display by emitting light under the conditions without a luminous source without requiring an external device such as a power supply.

In more detail, the present invention provides a display film comprising a first display layer which has a phosphorescent material on at least a part of a surface of an opaque and nonporous substrate sheet and on which a first image visible under the conditions without a luminous source is formed, a second display layer including a porous sheet having a plurality of pores, which is disposed on the first display layer in a manner such that the second display layer partially conceals the first image and on which a second image visible under a luminous source is formed, and a transparent protective layer disposed on the second display layer.

The present invention also provides a display film comprising a first display layer which has a shade material on at least a part of the surface of an opaque and nonporous substrate sheet and on which a first image visible under the conditions without a luminous source is formed, a second display layer including a porous sheet having a plurality of pores, which is disposed on the first display layer in a manner that the second display layer partially conceals the first image and on which a second image visible under a luminous source is also formed, and a transparent protective layer disposed on the second display layer.

In this specification, an "image" refers to a display to create a specific impression. Examples of images include images comprising a character, figure, symbol, or the like and images not comprising a character, figure, symbol, or the like and formed by merely the original color of the substrate sheet or by applying one color to the substrate sheet. Accordingly, there may be a case where the first display layer displays a character, figure, or the like and the second display layer is not provided with a coloring agent or the like and does not display a figure or the like at all.

In the present invention, the substrate sheet may comprise a phosphorescent material emitting light having a wavelength different from that of the phosphorescent material disposed on the surface of the substrate sheet.

The second display layer may have a coloring agent in at least a portion on the surface of the porous sheet to form a predetermined image visible in the daytime or the like under a luminous source.

The transparent protective layer is preferably composed of a material having a polymer matrix and a transparent filler dispersed therein.

The display film of the present invention is available as an image display for advertisements, signboards, billboards, or the like. The display film is particularly useful in the case where a device to illuminate the image cannot be installed due to a problem with installation space or the like.

Further details of the invention are defined in the features of the claims.

DETAILED DESCRIPTION OF THE PREFERRED EMBODIMENTS

Embodiments of the present invention will be explained in detail with reference to the drawings.

Figure 1:
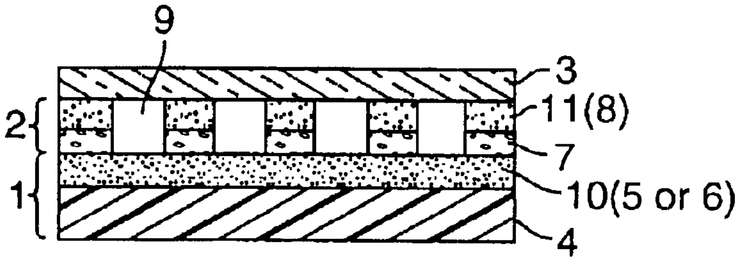
FIG. 1 is a cross-sectional view schematically showing a display film in one embodiment of the present invention.
Figure 2:
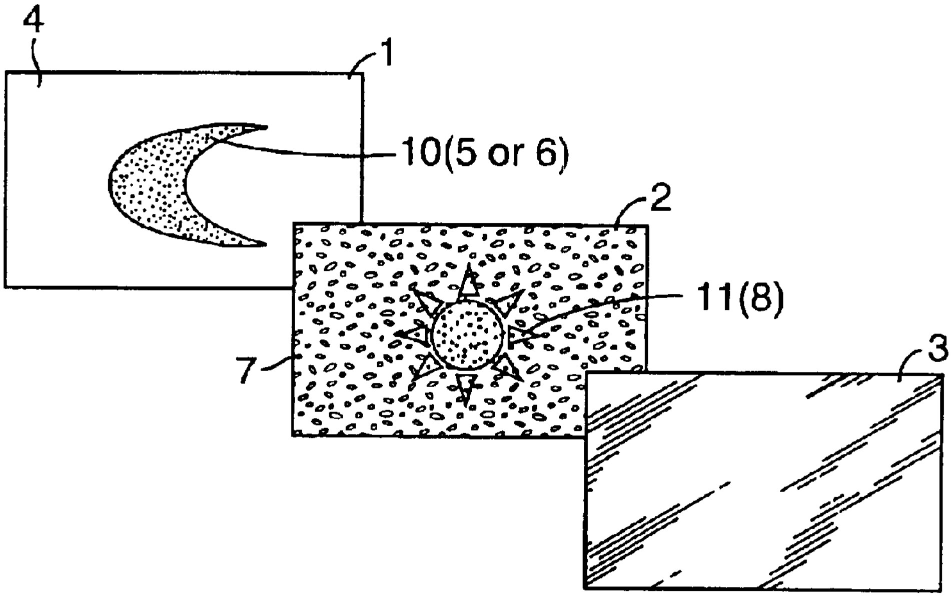
FIG. 2 is a view schematically showing a first image displayed under a luminous source and a second image displayed under the conditions without a luminous source in another embodiment of the present invention.

As shown in FIGS. 1 and 2, the display film of the present invention comprises a first display layer 1 which has an opaque and nonporous substrate sheet 4 optionally composed of a phosphorescent material and a phosphorescent material 5 or shade material 6 on at least a part of the surface of the substrate sheet 4 and on which a first image 10 visible under the conditions without a luminous source, for example, at night is formed, a second display layer 2 including a porous sheet 7 having a plurality of pores 9, which is disposed on the first display layer 1 in a manner that the second display layer 2 partially conceals the first image 10 and on which a second image 11 visible under a luminous source is also formed, and a transparent protective layer 3 disposed on the second display layer 2.

The display film having such a configuration can display an image under a luminous source such as sunlight or fluorescent light different from an image under the conditions without a luminous source, for example, at night without requiring an external device such as a power supply. The desire to save installation space can also be satisfied. Furthermore, since the second display layer 2 is provided with prescribed pores 9, the first image 10 is partially concealed so that the second image 11 different from the first image 10 of the first display layer 1 can be displayed while the first image 10 does not overlap the second image 11 and, at the same time, light to the first display layer 1 is not shaded so that a clear display with a high luminescence can be realized at night or the like. The present invention is hereinafter described in more detail.

The first display layer 1 has the opaque and nonporous substrate sheet 4 to conceal the color, figure, or the like of the object to which the display film is attached.

There are no specific limitations to the material for the substrate sheet 4 so long as the material is not light-transmissive. The substrate sheet 4 may be composed of a common nonluminescent material or a phosphorescent material.

When the substrate sheet 4 is composed of a common nonluminescent material, the phosphorescent material 5 must be disposed on at least a part of the surface of the substrate sheet 4 to cause the first display layer 1 to display a predetermined image visible under the conditions without a luminous source, for example, at night.

When the substrate sheet 4 is composed of a phosphorescent material, the shade material 6 is preferably disposed on at least a part of the surface of the substrate sheet 4 or the phosphorescent material 5 emitting light having a wavelength different from that of the phosphorescent material forming the substrate sheet 4 is preferably disposed on the surface of the substrate sheet 4.

If the shade material 6 is disposed, since the phosphorescent material of the substrate sheet 4 under the shade material 6 is not excited under a luminous source and does not emit light under the conditions without a luminous source, a die-cut image can be formed.

If the phosphorescent material 5 emitting light having a wavelength different from that of the phosphorescent material forming the substrate sheet 4 is disposed, a predetermined image can be formed based on the difference between the color of light emitted by the phosphorescent material 5 and the color of light emitted by the phosphorescent material forming the substrate sheet 4. The phosphorescent material 5 may function as the shade material 6, since light may be substantially prevented from being transmitted through the phosphorescent material 5.

Examples of the substrate sheet 4 composed of a nonluminescent material include Controltac™ Plus Graphic Films 8620 and 8640 (from 3M Company).

Examples of the substrate sheet 4 composed of a phosphorescent material include Scotchcal™ Luminous Film 5900 (from 3M Company).

Examples of the phosphorescent material 5 disposed on the substrate sheet 4 include a phosphorescent material containing an oxide phosphorescent agent using alkaline earth aluminate as matrix crystals, europium (Eu) as an activation agent, and dysprosium (Dy) or neodymium (Nd) as an activation assistant and a phosphorescent material containing at least one sulfide phosphorescent agent selected from the group consisting of CaS—Bi, CaSrS—Bi, ZnS—Cu, and ZnCdS—Cu. There are no limitations to the shade material 6 disposed on the substrate sheet 4 so long as the shade material 6 can reduce or block at least a part of the light that can excite the phosphorescent material. Various materials such as electrostatic toner, printing ink, and opaque sheet can be used as the shade material 6.

The color of the phosphorescent material 5 or shade material 6 disposed on the substrate sheet 4 identified under a luminous source preferably has a tone similar to that of the color of the surface of the substrate sheet 4 (composed of either a phosphorescent material or a nonluminescent material) identified under a luminous source.

When the color of the phosphorescent material 5 or shade material 6 identified under a luminous source is completely different from the color of the surface of the substrate sheet 4 identified under a luminous source, the first image 10 is identified via the pores of the porous sheet 7 of the second display layer in the daytime or the like under a luminous source. Since the first image 10 overlaps the second image 11, it may be difficult to identify the second image 11. Therefore, if the color of the surface of the substrate sheet 4 is identified to be yellowish green under a luminous source, for example, the color of the phosphorescent material 5 or shade material 6 is preferably identified to be a green-based or yellow-based color under a luminous source.

In the present invention, the phosphorescent material 5 or shade material 6 may be disposed by cutting a sheet containing a phosphorescent material or a opaque sheet to a desired shape and attaching the cut sheet to the substrate sheet 4.

Other preferable methods for attaching the phosphorescent material 5 or shade material 6 to the substrate sheet 4 include printing technologies such as electrostatic printing, electrophotographic imaging, ink jet printing, gravure printing, and offset printing.

In these methods using printing technologies, various toners or inks can be used as the phosphorescent material 5 or shade material 6. Examples of methods for printing using a toner by electrostatic printing include direct printing, wherein the phosphorescent material 5 or shade material 6 is attached to the surface of the substrate sheet 4 by directly printing the phosphorescent material 5 or shade material 6 on the surface of the substrate sheet 4 using a toner containing the material, and transfer printing, wherein the phosphorescent material 5 or shade material 6 is attached to the surface of the substrate sheet 4 by temporarily printing an image of the phosphorescent material 5 or shade material 6 on a temporary carrier using a toner containing the material and transferring the image to the substrate sheet 4.

To improve adhesion of the phosphorescent material 5 or shade material 6 to the surface of the substrate sheet 4 in the methods using printing technologies, primer processing is preferably carried out to attach the phosphorescent material 5 or shade material 6 to the surface of the substrate sheet 4, for example, via an acrylic resin or the like.

The substrate sheet 4 of the present invention may have either a single-layer structure or a multi-layer structure.

Accordingly, the substrate sheet 4 may be a single-layer sheet consisting of either a nonluminescent material or a phosphorescent material or a multi-layer sheet composed of a supportive layer consisting of a nonluminescent material and a luminescent layer consisting of a phosphorescent material, for example.

In the present invention, the back surface (the surface opposite to the surface contacting the second display layer 2) of the first display layer 1 having the above configuration may be provided with an adhesive to cause the display film to adhere to an object to be displayed. Examples of the adhesive include acrylic, silicone-based, synthetic rubber-based, and natural rubber-based pressure-sensitive adhesives. The thickness of the adhesive layer is preferably about 5 $\mu$m to about 60 $\mu$m, and more preferably about 20 $\mu$m to about 50 $\mu$m.

As shown in FIGS. 1 and 2, the second display layer 2 of the present invention comprises the porous sheet 7 having a plurality of pores to partially conceal the first image 10 formed in the above first display layer 1 and form the second image 11 visible under a luminous source.

In the porous sheet 7 of the present invention, the ratio of the surface area of the punched pores 9 to the total surface area of the porous sheet 7 including the pores 9 is preferably about 40% to about 60%, and more preferably about 45% to about 55%.

If the surface area ratio of the punched pores 9 is within this range, a desired shape or the like of the second image 11 can be identified under a luminous source while the first image 10 does not overlap the second image 11. Moreover, since light sufficient for emission can be supplied to the first display layer 1, a desired shape or the like of the first image 10 can be identified under the conditions without a luminous source.

There are no specific limitations to the shape of the pores 9 in the porous sheet 7 of the present invention. The cross-sectional shape of the pores 9 may be a circle, square, triangle, thin stripe, or any other. There are no specific limitations to the size or formation pattern of the pores 9. The formation pattern may be either regular-repetitive or irregular.

However, to realize a clear display of both the first image 10 and the second image 11, the pores 9 preferably have the shape of a circle and a diameter of about 0.5 mm to about 5.0 mm, and more preferably about 1.0 mm to about 3.0 mm.

The pores 9 of the porous sheet 7 in the present invention may be formed using any conventional method such as die cutting, punching, or laser application.

There are no specific limitations to the material for the porous sheet 7 in the present invention. The material may be a thermoplastic resin or the like, for example. A vinyl chloride resin is particularly preferable from the viewpoint of processability and workability.

The thickness of the porous sheet is preferably about 20 $\mu$m to about 180 $\mu$m, and more preferably about 50 $\mu$m to about 150 $\mu$m from the viewpoint of easy handling, processability, and workability.

Examples of a porous sheet satisfying the above conditions include Scotchcal™ Perforated Window Graphic Film 8671ES (from 3M Company).

As the second display layer 2 of the present invention to form a predetermined image visible in the daytime or the like under a luminous source, a display layer having a coloring agent 8 in at least a portion of the surface of the porous sheet to form a predetermined image such as a figure or character can be given, for example.

The coloring agent 8 can be selected from various printing inks, electrostatic toners, and the like, for example, according to the desired image.

The coloring agent 8 may be attached to the surface of the porous sheet 7 by cutting a coloring sheet to a desired shape and attaching the cut sheet to the porous sheet 7.

Other preferable methods for attaching the coloring agent 8 to the surface of the porous sheet 7 include printing technologies such as electrostatic printing, electrophotographic imaging, ink jet printing, gravure printing, and offset printing. The coloring agent 8 may be applied to the surface of the porous sheet 7 after forming the pores 9 by punching or before forming the pores 9.

To improve adhesion of the coloring agent 8 to the surface of the porous sheet 7, primer processing is preferably carried out to attach the coloring agent 7 to the surface of the porous sheet 8 via an acrylic resin, for example.

The porous sheet 7 of the present invention may have either a single-layer structure or a multi-layer structure. Examples of the porous sheet 7 having the multi-layer structure include a porous sheet prepared by laminating a colored layer such as a black layer on a white layer to increase concealability of the first image 10 according to the color, figure, or the like of the first display layer.

Examples of the method for laminating the second display layer 2 on the first display layer 1 in the present invention include a method comprising applying an adhesive to the surface of the second display layer 2 which contacts the first display layer 1 and causing the second display layer 2 to adhere to the first display layer 1 via the adhesive, and a method comprising providing the surface of the second display layer 2 which contacts the first display layer 1 with an adhesive sheet and causing the second display layer 2 to adhere to the first display layer 1 via the adhesive sheet.

In the latter method, a nonporous adhesive sheet covering the pores may be provided, if the sheet is colorless and transparent. However, it is preferable to dispose an adhesive sheet having the same shape, size, and formation pattern as those of the porous sheet 7 on the porous sheet 7 by causing the pores of the adhesive sheet to correspond with those of the porous sheet 7.

The transparent protective layer 3 in the present invention is disposed on the second display layer 2 to protect the surface of the second display layer 2.

Examples of the transparent protective layer 3 in the present invention include a transparent protective layer consisting of a protective film or a protective clear material applied dropwise to the surface of the second display layer 2 in a liquid state.

The transparent protective layer 3 consisting of a protective film or protective clear material is preferably composed of a material having a polymer matrix and a transparent filler dispersed therein to improve abrasion resistance and scratch resistance.

Examples of the filler include a glass fiber, glass bead, and mineral powder. Examples of a polymer composing the matrix include a vinyl chloride resin, acrylic resin, polyolefin resin, and urethane resin.

The protective film in the present invention preferably has an adhesive layer to cause the protective film to adhere to the surface of the second display layer 2.

The thickness of the transparent protective layer 3 is preferably about 10 μm to about 250 μm, and more preferably about 60 μm to about 230 μm from the viewpoint of ground protection, abrasion resistance, scratch resistance, and light transmittance.

Examples of the protective film with an adhesive layer satisfying the above conditions include SP4114, SP4169, and SP4855 (from 3M Company). Examples of the protective clear include Scotchcal™ Screen Print Clear 8920ES (from 3M Company).

A shiny finish or matte finish can be provided to the surface of the transparent protective layer 3 depending on the intended application.

The embodiments of the present invention are described as above in detail. The display film of the present invention can display an image under a luminous source such as sunlight or fluorescent light different from an image under the conditions without a luminous source. The display film can be used as an image display for advertisements, signboards, billboards, or the like, particularly in the case where a device to illuminate the image cannot be installed due to a problem with installation space or the like.

EXAMPLES

The present invention will be described in more detail by the following examples, which should not be construed as limiting the present invention.

(1) First Display Layer First, using an electrostatic printer (Scotchprint brand Model 9512 from 3M Company), a transfer image was printed on a record paper for image transfer (Transfer Media 8601, from 3M Company) using a toner containing a coloring agent (a shade material) exhibiting an yellowish color under a luminous source as a main component.

Second, using a laminator (Orca III, from 3M Company), a toner image was transferred to a substrate sheet (Luminous film 5900, from 3M Company) of a phosphorescent material (copper/zinc sulfide pigment) under the image transfer conditions with an upper roller temperature of 130° C., a lower roller temperature of 50° C., a web conveyance speed of 70 cm/min., and a pressure of 410 kPa to obtain a first display layer that can emit light by phosphorescence.

(2) Second Display Layer and Transparent Protective Layer

First, using an electrostatic printer (Scotchprint brand Model 9512, from 3M Company), a transfer image was printed on a record paper for image transfer (Transfer Media 8601, from 3M Company) using a colored toner exclusive for the record paper containing three types of coloring agents respectively exhibiting a yellowish, bluish, and reddish color under a luminous source as main components.

Second, using a laminator (Orca III, from 3M Company), a toner image was transferred to a porous sheet (Scotchcal brand Perforated Window Graphic Film 8671ES, from 3M Company) of which the back surface is provided with an adhesive layer and a release paper under the image transfer conditions with an upper roller temperature of 130° C., a lower roller temperature of 50° C., a web conveyance speed of 70 cm/min., and a pressure of 210–350 kPa to obtain a second display layer consisting of the porous sheet on which an image was formed.

Third, a protective film with an adhesive (Overlaminating film SP4855, from 3M Company) was caused to adhere to the surface of the porous sheet (the surface to which the toner image was transferred and to which the adhesive layer was not provided) via the adhesive of the protective film to obtain a laminate formed by disposing a transparent protective layer consisting of a transparent protective film on the porous sheet.

(3) Display Film

First, the above first display layer that can emit light by phosphorescence and the above laminate formed by disposing the protective layer on the porous sheet were installed in a laminator (Orca III, from 3M Company).

Second, while peeling off a release paper for protecting the adhesive layer laminated to the back surface of the porous sheet, the emerging surface for adhesion is disposed on the surface of the first display layer and pressed and laminated under the pressing conditions with upper and lower roller temperatures of room temperature, a web conveyance speed of 70 cm/min., and a pressure of 350 kPa to obtain a display film.

As shown in FIG. 2, in the display film thus obtained, an image of the sun that is a second image formed on a porous sheet 7 was identified under a luminous source such as sunlight or fluorescent light.

However, under the conditions without a luminous source such as sunlight or fluorescent light, for example, at night, since a coloring agent forming the second image is a nonluminescent material, the image of the sun that is the second image was not identified. On the other hand, a phosphorescent material forming a substrate sheet, except for a portion of the surface of the substrate sheet provided with a coloring agent in a shape of the moon, emitted light for around six hours after the illumination by the luminous source was terminated. As a result, a die-cut image of the moon was identified.

As described above, the present invention can provide a display film that can display an image under a luminous source different from an image under the conditions without a luminous source while saving installation space and can realize a clear display by emitting light under the conditions without a luminous source.

What is claimed is:

1. A display film comprising:

a first display layer which has a phosphorescent material on at least a part of a surface of an opaque and nonporous substrate sheet and on which a first image visible under a condition without a luminous source is formed, a second display layer including a porous sheet having a plurality of pores, which is disposed on said first display layer such that the second display layer partially conceals said first image and on which a second image visible under a luminous source is formed, and a transparent protective layer disposed on said second display layer.

2. A display film according to claim 1, wherein said substrate sheet comprises a phosphorescent material emitting light having a wavelength different from that of the phosphorescent material disposed on a surface of said substrate sheet.

3. A display film according to claim 2 wherein said second display layer has a coloring agent in at least a portion on a surface of said porous sheet, and a predetermined image visible under a luminous source is formed.

4. A display film according to claim 3 wherein said transparent protective layer is composed of a material having a polymer matrix and a transparent filler dispersed therein.

5. A display film according to claim 1 wherein said second display layer has a coloring agent in at least a portion on a surface of said porous sheet, and a predetermined image visible under a luminous source is formed.

6. A display film according to claim 1 wherein said transparent protective layer is composed of a material having a polymer matrix and a transparent filler dispersed therein.

7. A display film comprising:

a first display layer which has a shade material on at least a part of a surface of an opaque and nonporous substrate sheet comprising a phosphorescent material and on which a first image visible under a condition without a luminous source is formed, a second display layer including a porous sheet having a plurality of pores, which is disposed on said first display layer such that the second display layer partially conceals said first image and on which a second image visible under a luminous source is formed, and a transparent protective layer disposed on said second display layer.

8. A display film according to claim 7 wherein said second display layer has a coloring agent in at least a portion on a surface of said porous sheet, and a predetermined image visible under a luminous source is formed.

9. A display film according to claim 7 wherein said transparent protective layer is composed of a material having a polymer matrix and a transparent filler dispersed therein.

* * * * *